United States Patent
Lewis (10) Patent No.: US 7,619,980 B2
(45) Date of Patent: Nov. 17, 2009

(54) SYSTEM OPERABLE TO TRANSMIT AND RECEIVE MESSAGES

(75) Inventor: Michael Lewis, Märsta (SE)

(73) Assignee: Infineon Technologies AG, Munich (DE)

(*) Notice: Subject to any disclaimer, the term of this patent is extended or adjusted under 35 U.S.C. 154(b) by 674 days.

(21) Appl. No.: 10/890,709

(22) Filed: Jul. 14, 2004

(65) Prior Publication Data
US 2005/0026639 A1 Feb. 3, 2005

(30) Foreign Application Priority Data
Jul. 14, 2003 (SE) .................................... 0302068

(51) Int. Cl.
*G01R 31/08* (2006.01)
*H04L 12/413* (2006.01)
(52) U.S. Cl. ..................................... 370/242; 370/447
(58) Field of Classification Search ......... 370/445–448, 370/241, 242, 243, 244, 245, 246, 250, 251
See application file for complete search history.

(56) References Cited

U.S. PATENT DOCUMENTS

| | | | | |
|---|---|---|---|---|
| 4,941,143 | A * | 7/1990 | Twitty et al. ................. | 370/445 |
| 6,097,705 | A * | 8/2000 | Ben-Michael et al. ....... | 370/315 |
| 6,229,817 | B1 * | 5/2001 | Fischer et al. ................ | 370/445 |
| 6,480,310 | B1 * | 11/2002 | Fujinaga ...................... | 398/63 |
| 6,813,260 | B1 * | 11/2004 | Fogle ........................... | 370/338 |
| 6,859,463 | B1 * | 2/2005 | Mayor et al. ................. | 370/445 |
| 6,891,847 | B1 * | 5/2005 | Gubbi .......................... | 370/442 |
| 6,961,344 | B1 * | 11/2005 | Gaspar et al. ............... | 370/447 |
| 7,095,754 | B2 * | 8/2006 | Benveniste ................... | 370/465 |

(Continued)

FOREIGN PATENT DOCUMENTS

WO    WO 02/30022    4/2002

(Continued)

OTHER PUBLICATIONS

"Design of an Access Mechanism for a High Speed Distributed Wireless LAN" Gummalla, Ajay Chandra V.; Limb, John O.; IEEE Journal on Areas in Communications vol. 18, No. 9, Sep. 2000: p. 1740-1750.*

(Continued)

*Primary Examiner*—Seema S Rao
*Assistant Examiner*—Xavier Szewai Wong
(74) *Attorney, Agent, or Firm*—Dicke, Billig & Czaja, PLLC (57) ABSTRACT

A system, minimising transmission delays and avoiding loss of synchronisation, using a contention based multiple access protocol comprises n transceivers each comprising a detector for detecting the condition of the medium and connected to a controller for switching the transceiver from receiving to transmitting or vice versa. Each transceiver also comprises a to the controller connected backoff counter operable to decrement its count at the end of each time slot when performing a backoff procedure. A transceiver which wishes to transmit and is performing the backoff procedure for which the detector detects that the medium is busy, the controller freezes the backoff counter and if this medium busy condition is subsequently determined to be a false alarm the controller resumes the backoff counter at the beginning of the next time slot after rejection of the false alarm, using the time slot timings in force prior to the false alarm event.

28 Claims, 8 Drawing Sheets

U.S. PATENT DOCUMENTS

| | | | |
|---|---|---|---|
| 7,403,539 B1 * | 7/2008 | Tang et al. | 370/445 |
| 2002/0110085 A1 * | 8/2002 | Ho et al. | 370/230 |
| 2002/0188723 A1 * | 12/2002 | Choi et al. | 709/225 |
| 2003/0058968 A1 * | 3/2003 | Thomson et al. | 375/340 |
| 2003/0083095 A1 | 5/2003 | Liang | 455/552 |
| 2003/0103521 A1 * | 6/2003 | Raphaeli et al. | 370/445 |
| 2003/0145095 A1 * | 7/2003 | Liu et al. | 709/230 |
| 2004/0030530 A1 * | 2/2004 | Li et al. | 702/179 |
| 2004/0146022 A1 * | 7/2004 | Lewis et al. | 370/331 |
| 2004/0246932 A1 * | 12/2004 | Fischer | 370/338 |
| 2007/0019665 A1 * | 1/2007 | Benveniste | 370/445 |
| 2008/0062880 A1 * | 3/2008 | Yew et al. | 370/235 |

FOREIGN PATENT DOCUMENTS

| | | |
|---|---|---|
| WO | WO 02/054671 | 7/2002 |
| WO | WO 02/103943 | 12/2002 |

OTHER PUBLICATIONS

Bianchi, Guiseppe, et al.; "Kalman Filter Estimation of the Number of Competing Terminals in an IEEE 802.11 network"; 22nd Annual Joint Conf. of the IEEE Computer and Communications Societies, 2003.

W. Diepstraten et al.; "IEEE 802.11 Wireless Access Method and Physical Specification"; IEEE P802.11-94/150, Jul. 1994.

* cited by examiner

SYSTEM OPERABLE TO TRANSMIT AND RECEIVE MESSAGES

PRIORITY

This application claims priority to Swedish application no. 0302068-2 filed Jul. 14, 2003.

TECHNICAL FIELD OF THE INVENTION

The present invention relates in a first aspect to a system operable to transmit and receive messages.

In a second aspect the present invention relates to a transceiver means operable to transmit and receive messages.

In a third aspect the present invention relates to a method for transmitting and receiving messages.

In a forth aspect the present invention relates to at least one computer program product for transmitting and receiving messages.

DESCRIPTION OF RELATED ART

In the technical field of transceiver equipment such as IEEE802.11 WLAN using a contention-based multiple access protocol based on assessing media state (busy/free) prior to transmitting a message, such assessments and transmissions are aligned to time slots.

In an IEEE 802.11 WLAN, the problem of allowing multiple transmitters to share the wireless medium is solved using a so-called "listen before talk" protocol. Transceiver devices are in practice unable to simultaneously receive and transmit messages. Before transmitting a signal, each station must sense the condition of the wireless medium and may only transmit if the medium is free continuously for a defined period of time. If the medium is found to be busy, the station must perform a backoff procedure.

A difficulty in implementing such a scheme is that it takes a transceiver apparatus a certain length of time to reliably detect the presence of a transmission on the medium: in general, the longer time spent listening, the higher chance of detecting a transmission. Secondly, the apparatus takes a certain time to switch from reception to transmission state; during this time, it can no longer sense the state of the medium.

Figure 1:
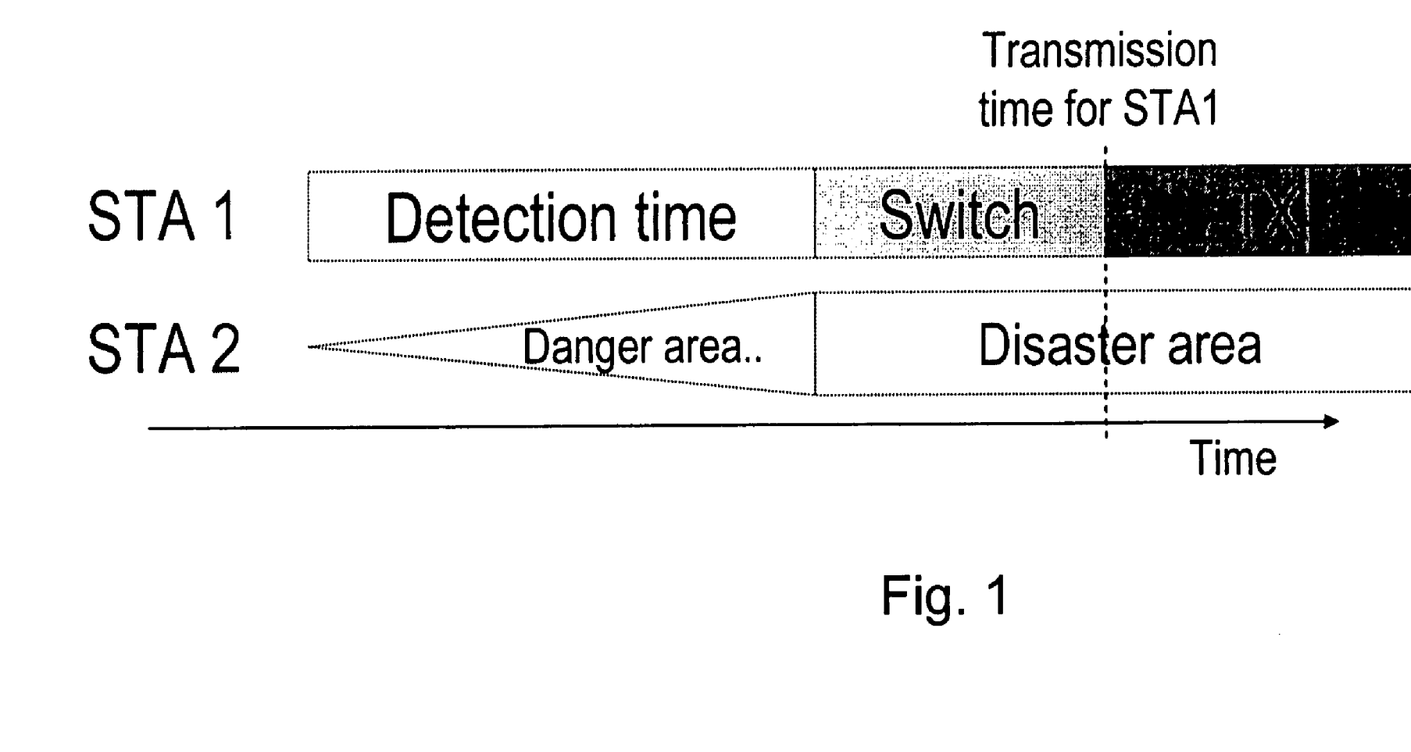
FIG. 1 shows a schematic diagram of problems with listen-before-talk protocol caused by non-zero detection and switch time according to the state of the art.

This is shown graphically in FIG. 1: transceiver station STA1 is sensing the medium, and if no transmission is detected it will begin transmitting at the time shown. In order to begin transmission at this time, the station must begin the receive-transmit switch process somewhat earlier, during the period in the figure denoted by the hatched rectangle. If STA2 begins transmitting at any time after the switch process has begun, a collision will occur since STA1 is at this point committed to sending its own transmission. In order to abort its transmission, STA1 must therefore have detected STA2's transmission before the switch process begins.

However, the actual detection process requires a finite amount of time: if STA2 begins transmitting before the detection time period shown on the figure, STA1 will with high chance of success detect the transmission. If STA2 begins transmitting during the detection time period, the chance of STA1 detecting the transmission will depend on how much detection time is available.

The mechanics of this process lead straightforwardly to the solution adopted for IEEE 802.11 WLAN. Instead of allowing stations to begin transmission at any time (and thereby risk landing in the danger interval prior to another station's transmission), transmissions are only allowed to begin at the start of defined "time slots": a time slot is defined as a detection time followed by a switch time, with the standard setting requirements on stations for meeting a minimum probability of detecting transmissions within the allowed detection time. The reference point for the beginning of the time slots is defined as a fixed inter-frame spacing (IFS) following the end of the last transmission on the medium, i.e. the time at which the medium ceases to be busy.

If a station wishes to transmit, and discovers that the medium is busy, the station selects a random time-slot within the so-called "contention window" (a number of time slots from the end of the message), and sets its backoff counter to indicate the chosen slot. At the end of the message, each station waits for the beginning of the time slots. Each station listens for the state of the medium (so-called Clear Channel Assessment or CCA) during each slot time. If a station has begun transmitting at the start of the slot, there is a high probability that the other stations will detect this during the CCA time. If no transmission is detected, the station decrements its backoff counter. If a transmission is detected, decrementing of the backoff counter is suspended during transmission, and restarts at the end of the first time slot following the transmission.

Figure 2:
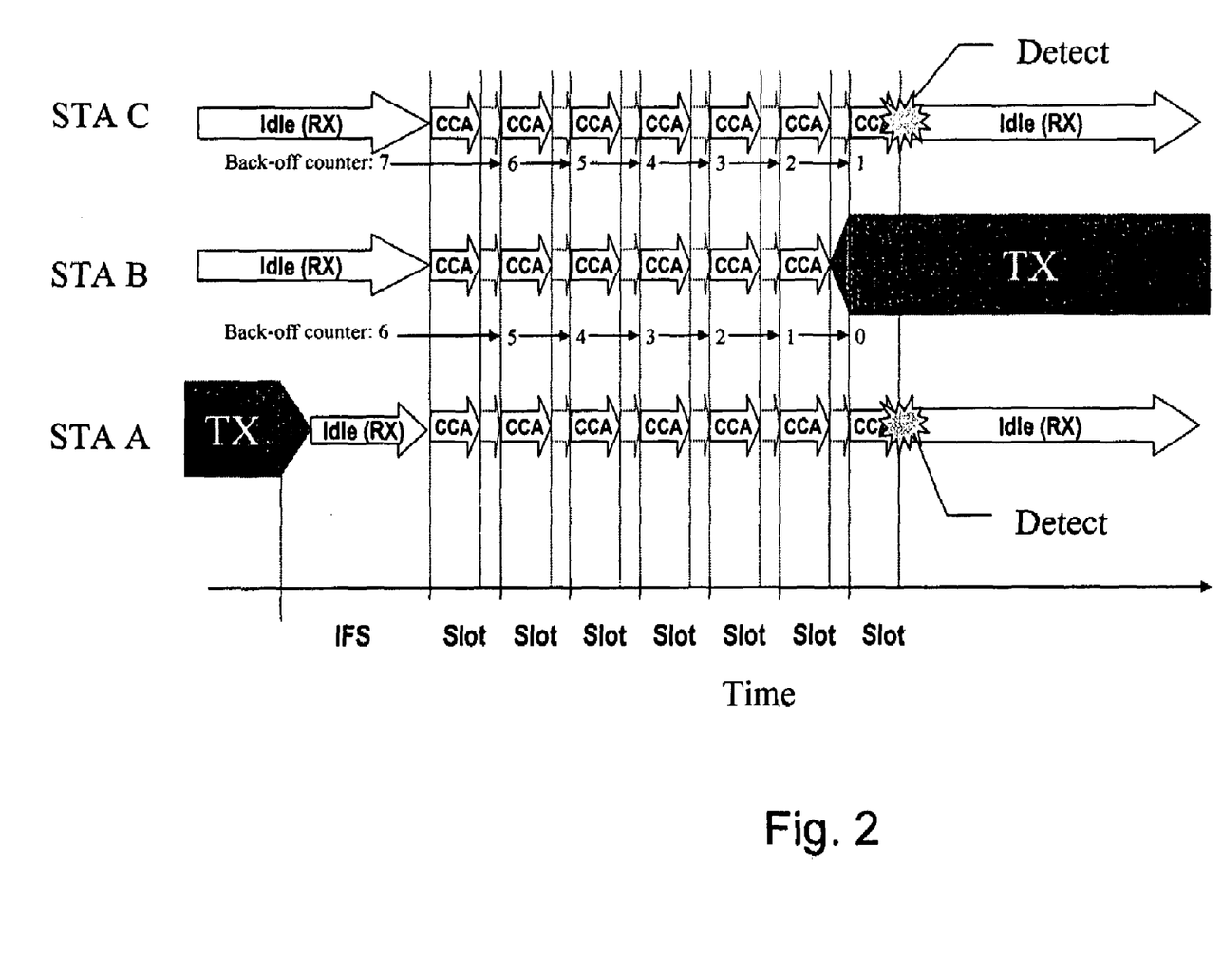
FIG. 2 shows a schematic diagram of the process with time slots and performing backoff following a transmission according to the state of the art.

An example of this process is shown FIG. 2: at first, station A is transmitting. Stations B and C both wish to transmit, and have chosen values of 5 and 6 for their back-off counters respectively. The first slot time begins one IFS period after the end of station A's transmission. All stations perform CCA during the slots, and no transmission is detected. At the end of each slot, stations B and C decrement their backoff counters, until the slot where station B's counter has a value of 1. In this slot, station B listens only to the end of the CCA period, after which it switches over from receive to transmit such that its transmission appears on the medium at the beginning of the next time slot. Stations A and C perform CCA at the beginning of the next slot, and detect the beginning of B's transmission. Station C therefore freezes its backoff counter with a value of 1 for the duration of B's transmission.

The synchronisation of stations enforced by the slotted access procedure means that the only case whereby a collision is possible is where two stations randomly choose the same value for their backoff counters (the protocol includes mechanisms for discovering such collisions and subsequently recovering). The main drawback with such a technique is the "dead time" on the air during the backoff slots. To improve efficiency, it is desirable to make the timeslot duration as short as possible; thereby reducing the granularity of the system in time. The main drawback with reducing the length of the slot time is that the clear channel assessment process becomes less reliable: in the presence of noise, any such detection process must trade off the probability of successfully detecting the presence of a signal against the false alarm probability where a signal is indicated when none is present. In general, the shorter time available for the detection process, the harder it is to reach an acceptable balance; and so in order to provide acceptable probability of detection with shorter slot times, the probability of false alarms becomes non-negligible.

Figure 3:
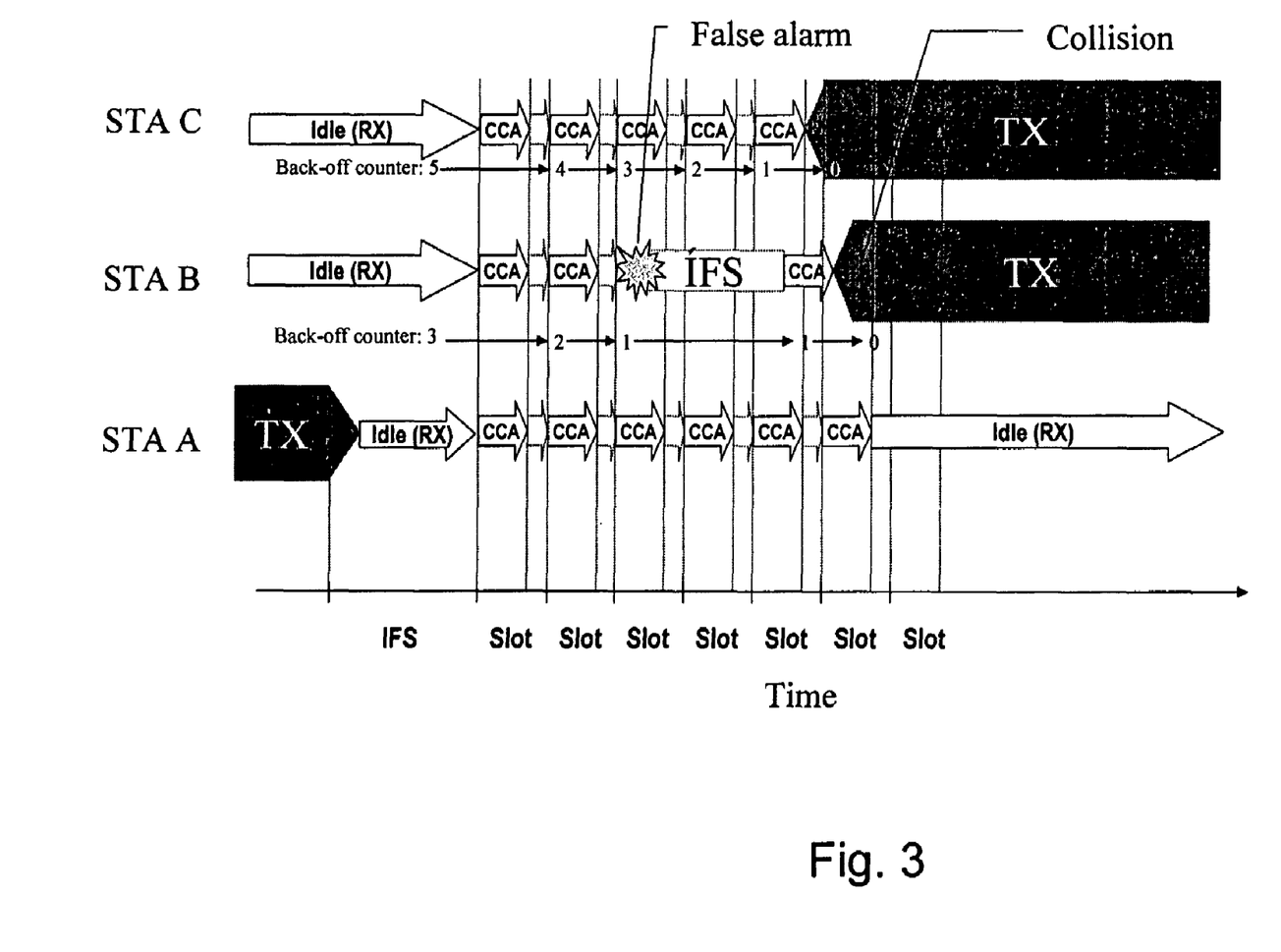
FIG. 3 shows a schematic diagram of loss of synchronisation following false detection event according to the state of the art.

False alarms cause two main problems. The first problem is that the backoff process is interrupted: the station experiencing a false alarm must wait for an IFS period from the end of the false alarm indication before resuming backoff. Secondly, and possibly more importantly, synchronisation between stations is broken. Since no other station observes the false alarm event, the backoff slots of the station experiencing the false alarm become unsynchronised from other stations, thereby increasing the probability of collisions. An example is shown in FIG. 3: station B has chosen a backoff value of 3, and should therefore transmit first. However, a false detection alarm occurs during the timeslot just before B should transmit. B is forced to wait an IFS from the end of the false detection event before resuming backoff. In the meantime, station C decrements its backoff counter and initiates a transmission. Since B is no longer synchronised to the other stations, C's transmission occurs too late in B's CCA period for station B to be able to detect it and back off. Therefore, station B proceeds with its own transmission and a collision occurs.

SUMMARY OF THE INVENTION

It is an object of the present invention to solve the above mentioned problems.

According to the present invention there is provided in a first aspect a system operable to transmit and receive messages via a wireless medium and/or a wired medium, minimising transmission delays and avoiding loss of synchronisation, using a contention based multiple access protocol. The system comprises a number, n, of transceiver means, wherein n is an integer and n≧2. Each transceiver means comprises a detection means operable to detect the condition of said medium. Each transceiver means also comprises a to said detection means connected control means operable inter alia to switch said transceiver means from receiving to transmitting or vice versa. Each transceiver means also comprises a to said control means connected backoff counter operable to decrement its count at the end of each time slot when performing a backoff procedure. A transceiver means which wishes to transmit and is performing said backoff procedure, for which said detection means detects that the medium is busy, said control means freezes said backoff counter. However, if this medium busy condition is subsequently determined to be a false alarm, the control means resumes said backoff counter at the beginning of the next time slot after rejection of said false alarm, using the time slot timings in force prior to the false alarm event. This system makes it possible to distinguish between false alarm events and genuine detection indications, and thereby minimises transmission delays and avoids loss of synchronisation. This system also reduces the amount of time required to gain access to the medium after a false alarm event, thereby increasing throughput. In addition, by reducing probability of collisions the number of retransmissions required are reduced which can significantly improve system throughput.

A further advantage in this context is achieved if a time slot is defined as a detection time followed by a switch time for said transceiver means.

Furthermore; it is an advantage in this context if said control means starts said backoff counter after the duration of a fixed inter-fame spacing (IFS) following the end of the last transmission on said medium.

A further advantage in this context is achieved if said detection time of a time of a time slot is the so called Clear Channel Assessment period (CCA period) during which period each transceiver means is receiving.

Furthermore, it is an advantage in this context if said condition of medium detected by said detection means is either busy, free or false alarm.

A further advantage in this context is achieved if said detection means detects a busy condition, i.e. a transmission, of said medium, said control means freezes said backoff counter and resumes said backoff counter at the beginning of the next slot following said busy condition of said medium, i.e. transmission.

Furthermore, it is an advantage in this context if said control means distinguish between a false alarm condition and a busy condition by the use of the duration of the said detection means detected event.

According to another embodiment, it is an advantage if a modulation format IEEE 802.11a/802.11g is used, said control means distinguish a false alarm condition when said detection means detects an absence of a long preamble symbol.

According to another embodiment, it is an advantage if the DSSS modulation format defined in IEEE 802.11/802.11b and the short slot time defined in IEEE 802.11g is used, said control means distinguish between a false alarm condition and a busy condition by making use of a longer CCA period for detection of DSSS modulated signals.

Another object of the invention is to provide a transceiver means operable to transmit and receive messages via a wireless medium and/or a wired medium, minimising transmission delays and avoiding loss of synchronisation, using a contention based multiple access protocol. The transceiver means comprises a detection means operable to detect the condition of said medium. The transceiver means also comprises a to said detection means connected control means operable inter alia to switch said transceiver means from receiving to transmitting or vice versa. The transceiver means also comprises a to said control means connected backoff counter operable to decrement its count at the end of each time slot. A transceiver means which wishes to transmit and is performing said backoff procedure, for which said detection means detects that the medium is busy, said control means freezes said backoff counter. However, if this medium busy condition is subsequently determined to be a false alarm, the control means resumes said backoff counter at the beginning of the next time slot after rejection of said false alarm, using the time slot timings in force prior to the false alarm event. This transceiver means makes it possible to distinguish between false alarm events and genuine detection indications, and thereby minimises transmission delays and avoids loss of synchronisation. This transceiver means also reduces the amount of time required to gain access to the medium after a false alarm event, thereby increasing throughput. In addition, by reducing the probability of collisions the number of retransmissions required are reduced which can significantly improve throughput.

A further advantage in this context is achieved if a time slot is defined as a detection time followed by a switch time.

Furthermore, it is an advantage in this context if said control means starts said backoff counter after the duration of a fixed inter-frame spacing (IFS) following the end of the last transmission on said medium.

A further advantage in this context is achieved if said detection time of a time slot is the so called Clear Channel Assessment period (CCA period) during which period said transceiver means is receiving.

Furthermore, it is an advantage in this context if said condition of said medium detected by said detection means is either busy, free or a false alarm.

A further advantage in this context is achieved if said detection means detects a busy condition, i.e. a transmission, of said medium, said control means freezes said backoff counter and resumes said backoff counter at the beginning of the next slot following said busy condition of said medium, i.e. transmission.

Furthermore, it is an advantage in this context if said control means distinguish between a false alarm condition and a busy condition by the use of the by said detection means detected event.

According to another embodiment, it is an advantage if a modulation format IEEE 802.11a/802.11g is used, said control means distinguish a false alarm condition when said detection means detects an absence of a long preamble symbol.

According to another embodiment, it is an advantage if the DSSS modulation format defined in IEEE 802.11/802.11b and the short slot time defined in IEEE 802.11g is used, said control means distinguish between a false alarm condition and a busy condition by making use of a longer CCA period for detection of DSSS modulated signals.

According to yet another embodiment, it is an advantage if said control means distinguish between a false alarm condition and a busy condition by the use of an absence of a second CCA period detected by said detection means.

Another object of the invention is to provide a method for transmitting and receiving messages via a wireless medium and/or a wired medium, minimising transmission delays and avoiding loss of synchronisation, using a contention based multiple access protocol. The method makes use of a number, n, of transceiver means, wherein n is an integer and n≧2. The method comprises the steps:
to detect the condition of said medium;
if a transceiver means wishes to transmit when said medium is detected busy, it selects a random time slot and sets its backoff counter to indicate the chosen time slot, which backoff counter is operable to decrement its count at the end of each time slot;
if medium busy is detected, to freeze said backoff counter;
to detect if said medium busy was caused by a false alarm, and
to resume said backoff counter at the beginning of the next time slot after rejection of said false alarm. This method makes it possible to distinguish between false alarm events and genuine detection indications, and thereby minimises transmission delays and avoids loss of synchronisation. This method also reduces the amount of time required to gain access to the medium after a false alarm event, thereby increasing throughput. In addition, by reducing the probability of collisions the number of retransmissions required are reduced which can significantly improve throughput.

A further advantage in this context is achieved if a time slot is defined as a detection time following by a switch time for said transceiver means.

Furthermore, it is an advantage in this context if said method also comprises the step:
to start said backoff counter after the duration of a fixed interframe spacing (IFS) following the end of the last transmission on said medium.

A furthermore advantage in this context is achieved if said detection time slot is the so called Clear Channel Assessment period (CCA period) which period each transceiver means is receiving.

Furthermore, it is an advantage in this context if said detection step is preformed by,
detecting a busy condition; or
detecting a free condition; or
detecting a false alarm condition.

A further advantage in this context is achieved if said method also comprises the steps:
if a busy condition, i.e. a transmission, is detected, to freeze said backoff counter; and
to resume said backoff counter at the beginning of the next time slot following said busy condition of said medium, i.e. transmission.

Furthermore, it is an advantage in this context if said method also comprises the step:
to distinguish between a false alarm condition and a busy condition by the use of the duration of the detected event.

According to another embodiment, it is an advantage if a modulation format IEEE 802.11a/802.11g is used, said method also compromises the step:
to distinguish a false alarm condition by detecting an absence of a long preamble symbol.

According to another embodiment, it is an advantage if the DSSS modulation format defined in IEEE 802.11/802.11b and the short slot time defined in IEEE 802.11g is used, said method also comprises the step:
to distinguish between a false alarm and a busy condition by making use of a longer CCA period for detection of DSSS modulated signals.

According to yet another embodiment, it is an advantage if said method comprises the step:
to distinguish between a false alarm condition and a busy condition by detecting an absence of a second CCA period.

Another object of the invention is to provide at least one computer program product directly loadable into the internal memory of at least one digital computer. The at least one computer program product comprises software code portion for performing the steps of the method according the present invention, when said at least one product is/are run on said at least one computer. This at least one computer program product makes it possible to distinguish between false alarm events and genuine detection indications, and thereby minimise transmissions delays and avoid loss of synchronisation. This product also reduces the amount of time required to gain access to the medium after a false alarm event, thereby increasing throughput. In addition, by reducing the probability of collisions the number of retransmissions required are reduced which can significantly improve throughput.

It should be emphasised that the term "comprises/comprising" when used in this specification is taken to specify the presence of stated features, steps or components but does not preclude the presence of one or more other features, integers, steps components or groups thereof.

BRIEF DESCRIPTION OF THE DRAWINGS

Embodiments of the invention will now be described with a reference to the accompanying drawings, in which.

DETAILED DESCRIPTION OF THE EMBODIMENT

Figure 4:
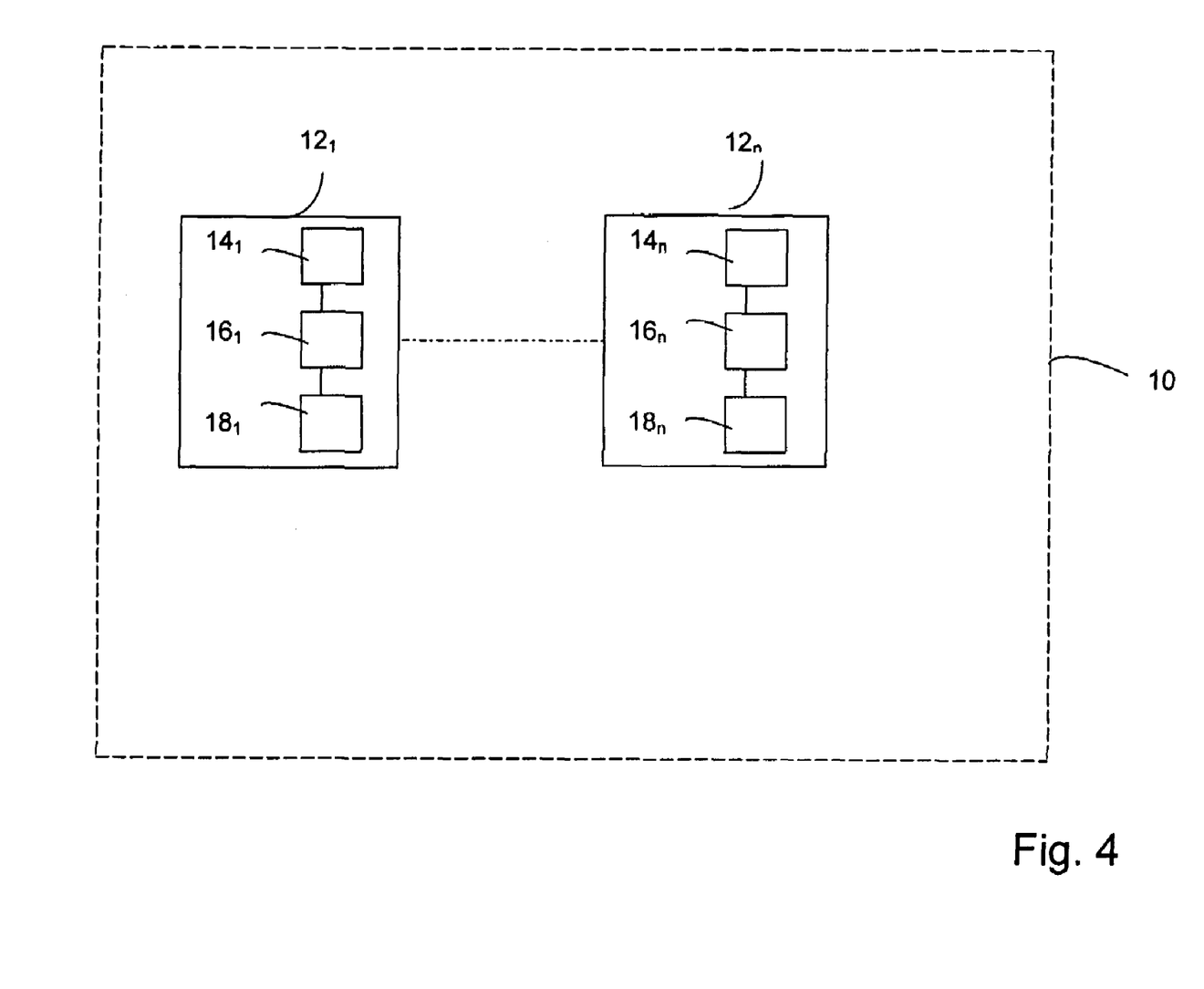
FIG. 4 shows a block diagram of a system operable to transmit and receive messages via a wireless medium and/or a wired medium according to the present invention.

In FIG. 4 there is disclosed a block diagram of a system 10 operable to transmit and receive messages via a wireless medium and/or a wired medium according to the present invention. The system 10 makes use of a contention based multiple access protocol. The system 10 comprises a number, n, of transceiver means 121, ..., 12n, wherein n is an integer and n>2. For the sake of convenience, there is only disclosed two transceiver means 121, 12n in FIG. 4. Each transceiver means 121, ..., 12n comprises a detection means 141, ..., 14n operable to detect the condition of the medium (not disclosed in the figure). Each transceiver means 121, ..., 12n also comprises a control means 161, ..., 16n operable inter alia to switch the transceiver means 121, ..., 12n from receiving to transmitting or vice versa. The control means 161, ..., 16n is connected to the detection means 141, ..., 14n. Each transceiver means 121, ..., 12n also comprises a backoff counter 181, ..., 18n operable to decrement its count at the end of each time slot when performing a backoff procedure. Backoff is only performed the first time the medium is detected busy. If the medium is detected busy during the backoff procedure, the backoff procedure is only paused (no new backoff counter value is chosen). The backoff counter 181, ..., 18n is connected to the control means 161, ..., 16n. A transceiver means, e.g. 121 which wishes to transmit and is performing said backoff procedure, for which said detection means 141 detects that the medium is busy, said control means 161 freezes said backoff counter 181. However, if this medium busy condition is subsequently determined to be a false alarm, the control means 161 resumes said backoff counter 181 at the beginning of the next time slot after rejection of said false alarm, using the time slot timings in force prior to the false alarm event. (See also FIG. 7).

Figure 5:
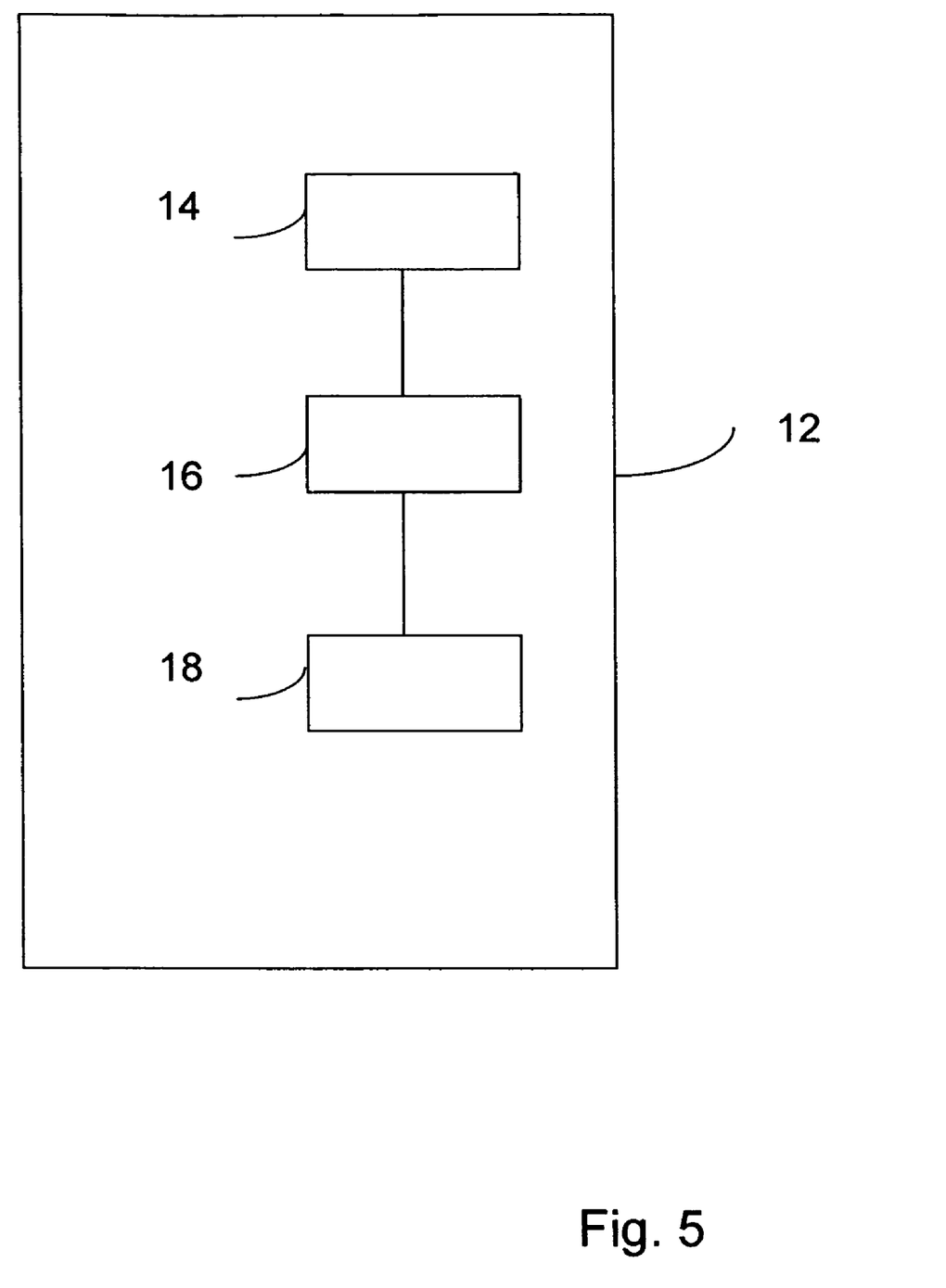
FIG. 5 shows a block diagram of a transceiver means operable to transmit and receive messages via a wireless medium and/or a wired medium according to the present invention.

In a preferred embodiment of the system 10 and the transceiver means 12 according to the present invention, a time slot is defined as a detection time followed by a switch time.

In a preferred embodiment of the system 10 and the transceiver means 12 according to the present invention, said control means 161, ..., 16n; 16 starts the backoff counter 181, ..., 18n; 18 after the duration of a fixed inter-frame spacing (IFS) following the end of the last transmission on said medium.

In a preferred embodiment of the system 10 and the transceiver means 12 according to the present invention, said detection time of a time slot is the so called Clear Channel Assessment period during which period each transceiver means 121, ..., 12n; 12 is receiving.

In a preferred embodiment of the system 10 and the transceiver means 12 according to the present invention, said condition of said medium detected by the detection means 141, ..., 14n; 14 is either busy, free or a false alarm.

In a preferred embodiment of the system 10 and the transceiver means 12 according to the present invention, if said detection means 141, ..., 14n; 14 detects a busy condition, i.e. a transmission, of said medium, the control means 16 161, ..., 16n; 16 freezes the backoff counter 181, ..., 18n; 18 and resumes the backoff counter at the beginning of the next time slot following said busy condition of said medium, i.e. transmission.

In a preferred embodiment of the system 10 and transceiver means 12 according to the present invention, the control means 161, ..., 16n; 16 distinguish between a false alarm condition and a busy condition by the use of the duration of the by the detection means 141, ..., 14n; 14 detected event.

In another embodiment of the system 10 and the transceiver means 12, if a modulation format IEEE 802.11a/802.11g is used, the control means 161, ..., 16n; 16 distinguish a false alarm condition when the detection means 141, ..., 14n; 14 detects an absence of a long preamble symbol.

In yet another embodiment of the system 10 and the transceiver means 12, if the DSSS modulation format defined in IEEE 802.11/802.11b and the short slot time defined in IEEE 802.11g is used, the control means 161, ..., 16n; 16 distinguish between a busy condition by making use of a longer CCA period for detection of DSSS modulated signals.

In yet another embodiment of the system 10 and the transceiver means 12, the control means 161, ..., 16n; 16 distinguish between a false alarm condition and a busy condition by the use of an absence of a second CCA period detected by the detection means 141, ..., 14n; 14.

In FIG. 5 there is disclosed a block diagram of a transceiver means 12 operable to transmit and receive messages via a wireless medium and/or a wired medium according to the present invention. The transceiver means 12 makes use of a contention based multiple access protocol. The transceiver means 12 comprises a detection means 14 operable to detect the condition of the medium (not disclosed on the FIG. 5). The transceiver means 12 also comprises a control means 16 operable inter alia to switch the transceiver means 12 from receiving to transmitting or vice versa. The control means 16 is connected to the detection means 14. The transceiver means 12 also comprises a backoff counter 18 operable to decrement its count at the end of each time slot. The backoff counter 18 is connected to the control means 16. If the transceiver means 12 wishes to transmit, when the medium is detected busy by the detection means 14, the transceiver means 12 selects a random time slot and sets the backoff counter 18 to indicate the chosen time slot. At the end of the busy period, the control means 16 begins to decrement the backoff counter 18 at the end of each slot time, unless the detection means 14 indicates that the medium is busy in which case the control means 16 freezes the backoff counter 18. If after such an indication the detection means 14 detects that said indication was a false alarm the control means 16 then resumes the backoff counter 18 at the beginning of the next time slot after rejection of the false alarm.

Figure 6:
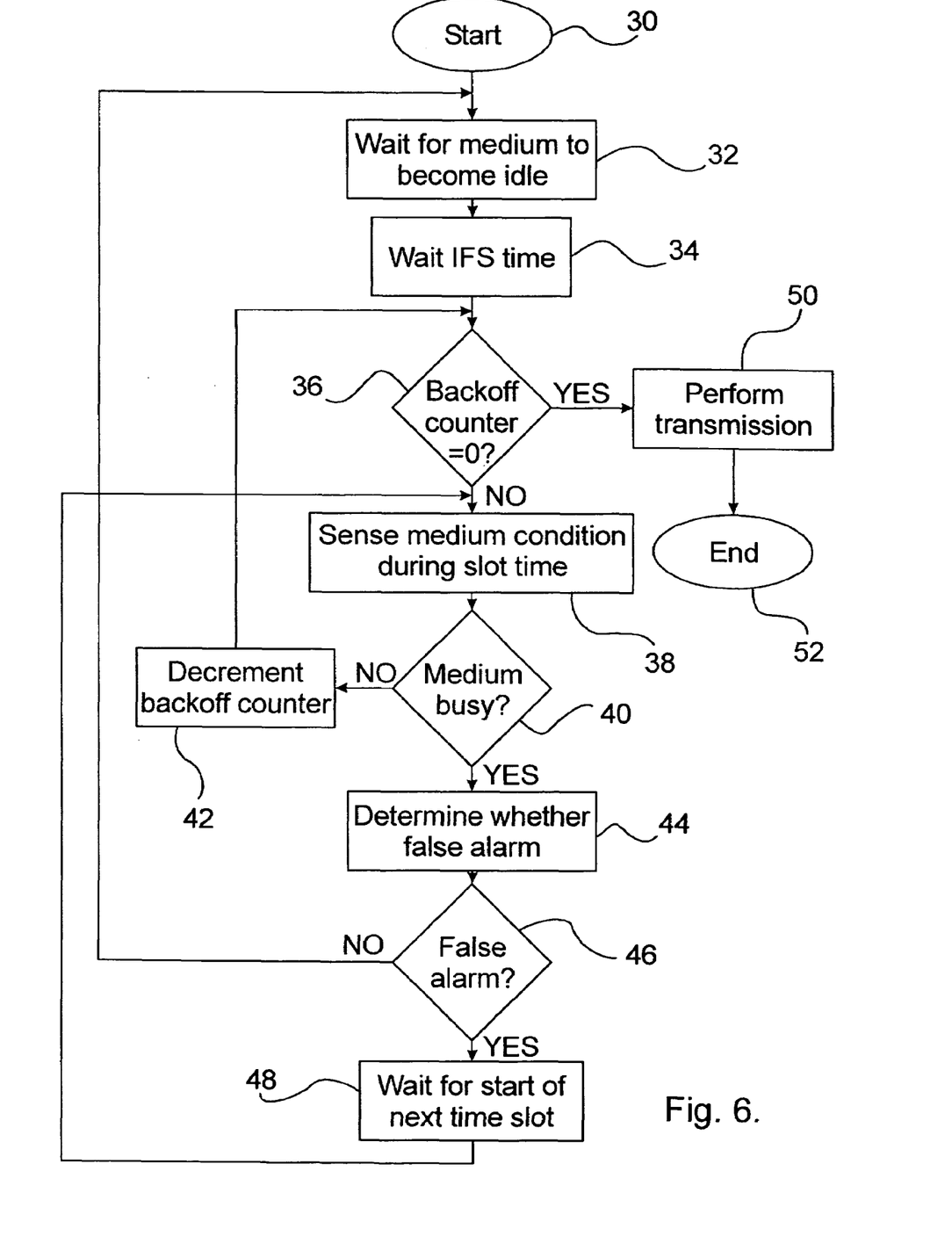
FIG. 6 is a flow chart of a method for transmitting and receiving messages via a wireless medium and/or a wired medium according to the present invention.

In FIG. 6 there is disclosed a flow chart of the method for transmitting and receiving messages via a wireless medium and/or a wired medium according to the present invention. The method makes use of a contention based multiple access protocol. The method begins at block 30, where a transceiver means wishes to transmit but has found the medium to be busy, and has a value stored in its backoff counter. At block 32 the method continues with the step: the transceiver means waits for the medium to become idle. The method continues at block 34, with the step: the transceiver means waits an IFS time (inter-frame spacing time) following the end of the last transmission on the medium. The next step, at block 36, is performed by asking the question: is the backoff counter equal to zero? If the answer is affirmative the method continues, at block 50, with the step: the transceiver means performs the transmission. The method is completed at block 52. If, on the other hand, the answer at block 36 is in the negative, the method continues, at block 38, with the step: to sense/detect the condition of the medium during the slot time. The next step, at block 40, is preformed by asking the question: is the medium busy? If the answer is in the negative the method continues, at block 42, with the step: to decrement the backoff counter. Then the method continues with block 36 again. If, on the other hand, the answer at block 40, is affirmative, the method continues, at block 44, with the step: to determine whether the indication that the medium is busy, is a false alarm. If the answer is in the negative, then the method continues with block 32 again. If, on the other hand, the answer, at block 46 is affirmative, the method continues, at block 48, with the step: to wait for the start of the next time slot. Thereafter, the method continues with the block 38 again.

In a preferred embodiment of the method according to the present invention, the method also comprises the step:

to start the backoff counter 181, . . . , 18n after the duration of a fixed inter-frame spacing (IFS) following the end of the last transmission on said medium.

In a preferred embodiment of the method according to the present invention, the detection step is performed by,     detection of a busy condition; or
    detection of a free condition; or
    detecting of a false alarm condition.

In a preferred embodiment of the method according to the present invention, the method also comprises the steps:

if a busy condition, i.e. transmission, is detected, to freeze said backoff counter 181, . . . , 18n; at the beginning of the next time slot following the busy condition of said medium; i.e. transmission.

A false detection event due to receiver noise is typically a short-lived event. Also, in many cases it is possible to use further measurements to confirm or reject the detection decision. For example, in a practical receiver for the IEEE 802.11a/802.11g OFDM modulation format, detection is typically performed on the short preamble section. The receiver will then typically search for the beginning of the long preamble section in order to perform e.g. channel estimation. The absence of the long preamble section can be used to indicate a false detection alarm. Similarly, for the case of the IEEE 802.11g Barker preamble when operating with short slot time, it is possible to use a longer CCA estimation period to confirm or reject the initial detection decision.

Any valid transmission, on the other hand, will cause busy medium to be indicated for the entire duration of the transmission. This duration is significantly longer than time periods over which CCA assessment is performed.

Figure 7:
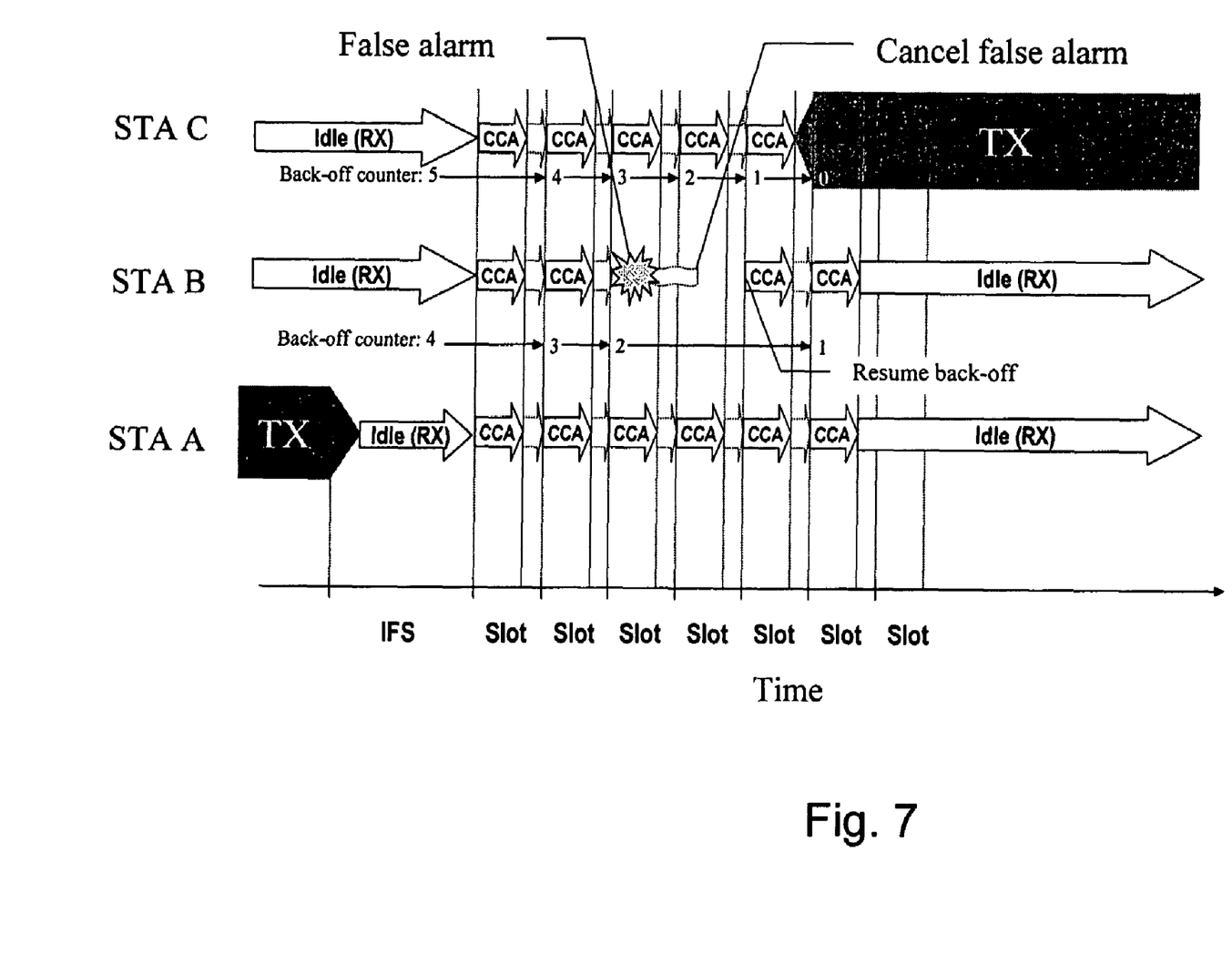
FIG. 7 shows a schematic diagram of recovering from false alarm event and resynchronising with slot timing according the present invention.

The transceiver device may therefore use the duration of the medium busy indication (and possibly other information such as absence of the long preamble section or absence of a second confirming CCA detection) in order to distinguish between false alarm events and detection of valid transmissions on the medium. In the case where a false alarm occurs, the transceiver freezes the backoff process until the false alarm is discovered. At this point, the transceiver waits until the beginning of the next time slot (according to the slot timings prior to the false detection event), and then resumes the back-off process. An example is shown in 7. Here, station B experiences a false alarm, which by the middle of the next time slot can be rejected. The station then resynchronises with the slot timing by resuming the back-off process at the beginning of the next time slot. Station B is thus able to correctly observe the beginning of station C's transmission.

Figure 8:
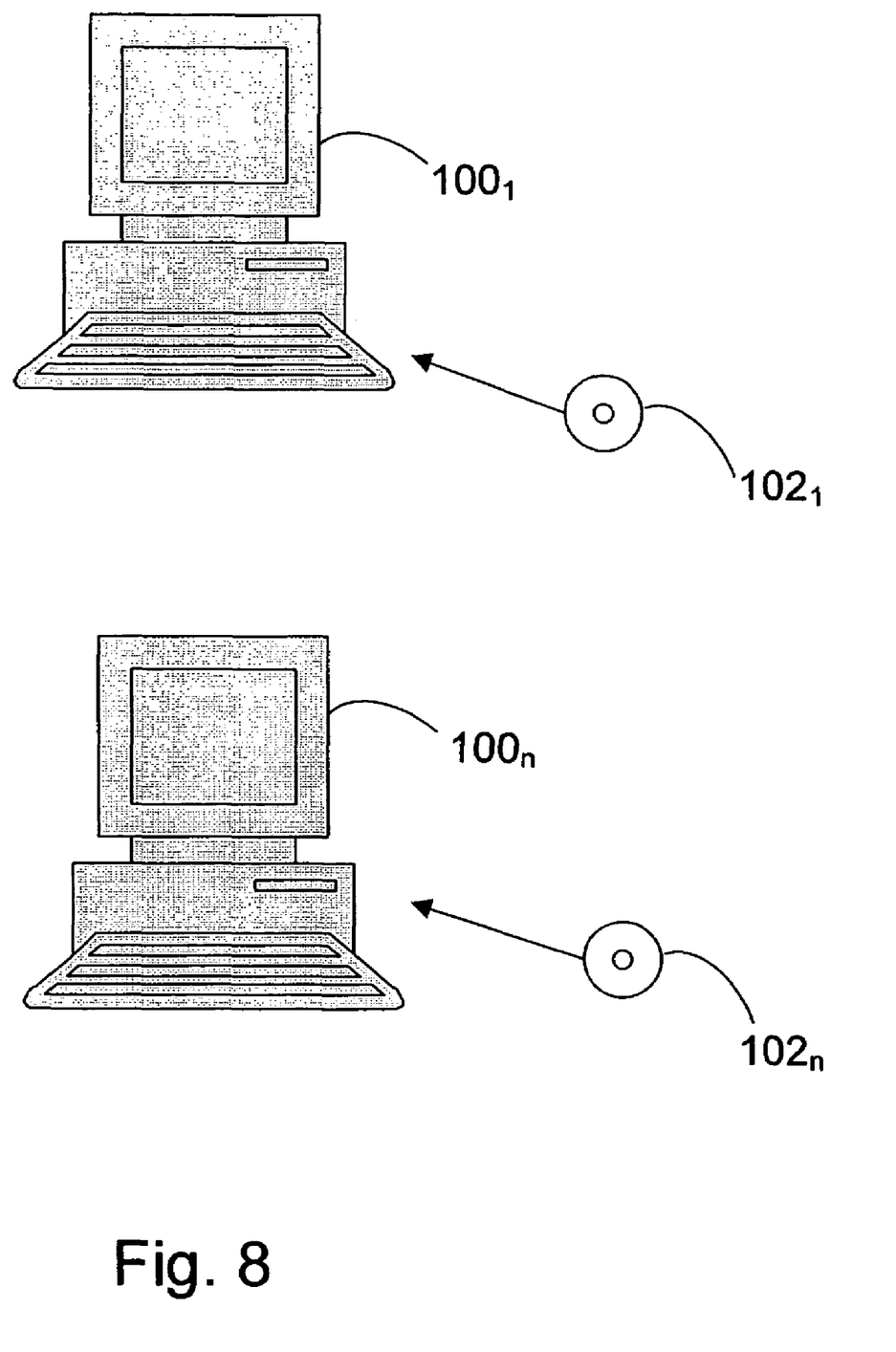
FIG. 8 shows a schematic diagram of some computer program products according to the present invention.

In FIG. 8, there is disclosed a schematic diagram of some computer program products according to the present invention. There is disclosed n different digital computers 1001, . . . , 100n, wherein n is an integer. There is also disclosed n different computer program products 1021, . . . , 102n here shown in the form of compact discs. The different computer program products 1021, . . . , 102n are directly loadable into the internal memory of the n different digital computers 1001, . . . , 100n. Each computer program product 1021, . . . , 102n comprises software code portions for performing some or all the steps of claim 19 when the product(s) 1021, . . . , 102n is/are run on said computer(s) 1001, . . . , 100n. Said computer program products 1021, . . . , 102n can e.g. be in the form of floppy disks, RAM disks, magnetic tapes, opto magnetical disk or any other suitable products. The invention is not limited to the embodiments described in the foregoing. It will be obvious that many different modifications are possible within the scope of the following claims.

The invention claimed is:

1. A system configured to transmit and receive messages via a wireless medium and/or a wire medium, minimizing transmission delays and avoiding loss of synchronization, using a contention based multiple access protocol, which system comprises n transceiver means, wherein n is an integer and $n \geq 2$, wherein each transceiver means comprises a detection means operable to detect the condition of said medium, wherein each transceiver means also comprises a control means connected to said detection means operable to switch said transceiver means from receiving to transmitting or vice versa, wherein each transceiver means also comprises a back-off counter connected to said control means operable to decrement its count at the end of each time slot in a sequence of time slots when performing a back-off procedure, wherein a transceiver means which wishes to transmit and is performing said back-off procedure for which said detection means detects that said medium is busy, said control means freezes said back-off counter and if this medium busy condition is subsequently determined to be a false alarm said control means resumes said back-off counter at the beginning of the immediate next time slot in the sequence of time slots after the time slot in which rejection of said false alarm occurs, using the time slot timings in force prior to said false alarm event.

2. The system according to claim 1, wherein a time slot is define as a detection time followed by a switch time for said transceiver means.

3. The system according to claim 1, wherein said control means starts said back-off counter after the duration of a fixed inter-frame spacing following the end of the last transmission on said medium.

4. The system according to claim 2, wherein said detection time of a time slot is the Clear Channel Assessment period during which period each transceiver means is receiving.

5. The system according to claim 1, wherein said condition of said medium detected by said detection means is either busy, free or a false alarm.

6. The system according to claim 5, wherein if said detection means detects a busy condition, of said medium said control means freezes said back-off counter and resumes said back-off counter at the beginning of the next time slot following said busy condition of said medium.

7. The system according to claim 1, wherein said control means distinguish between a false alarm condition and a busy condition by the use of a duration of the by said detection means detected event.

8. The system according to claim 1, wherein, if a modulation format IEEE 802.11a/802.11g is used, said control means distinguish a false alarm condition when said detection means detects an absence of a long preamble symbol.

9. The system according to claim 4, wherein, if the DSSS modulation format defined in IEEE 802.11/802.11b and the short time defined in IEEE 802.1g is used, said control means distinguish between a false alarm condition and a busy condition by making use of a longer CCA period for detection of DSSS modulated signals.

10. A transceiver means configured to transmit and receive messages via a wireless medium and/or a wired medium, minimizing transmission delays and avoiding loss of synchronization, using a contention based multiple access protocol, which transceiver means comprises a detection means operable to detect the condition of said medium, a control means connected to said detection means operable to switch said transceiver means from receiving to transmitting or vice versa, a back-off counter connected to said control means operable to decrement its count at the end of each time slot in a sequence of time slots when performing a back-off procedure, wherein a transceiver means which wishes to transmit and is performing said back-off procedure, for which said detection means detects that said medium is busy, said control means freezes said back-off counter, and if this medium busy condition is subsequently determined to be a false alarm, said control means resumes said back-off counter at the beginning of the immediate next time slot in the sequence of time slots after the time slot in which rejection of said false alarm occurs, using the time slot timings in force prior to said false alarm event.

11. The transceiver means according to claim 10, wherein a time slot is defined as a detection time followed by a switch time.

12. The transceiver means according to claim 10, wherein said control means starts said back-off counter after the duration of a fixed inter-frame spacing following the end of the last transmission on said medium.

13. The transceiver means according to claim 11, wherein said detection time of a time slot is the Clear Channel Assessment period during which period said transceiver means is receiving.

14. The transceiver means according to claim 10, wherein said condition of said medium detected by said detection means is either busy, free or a false alarm.

15. The transceiver means according to claim 14, wherein, if said detection means detects a busy condition, of said medium, said control means freezes said back-off counter and resumes said back-off counter at the beginning of the next time slot following said busy condition of said medium.

16. The transceiver means according to claim 10, wherein said control means distinguish between a false alarm condition and a busy condition by the use of the by said detection means detected event.

17. The transceiver means according to claim 10, wherein, if a modulation format IEEE 802.11a/802.11g is used, said control means distinguish a false alarm condition when said detection means detects an absence of a long preamble symbol.

18. The transceiver means according to claim 10, wherein, if the DSSS modulation format defined in IEEE 802.11/802.11b and the short slot time defined in IEEE 802.11g is used, said control means distinguish between a false alarm condition and a busy condition by making use of a longer CCA period for detection of DSSS modulated signals.

19. A method for transmitting and receiving messages via a wireless medium and/or a wired medium, minimizing transmission delays and avoiding loss of synchronization, using a contention based multiple access protocol, which method makes use of a number, n, of transceiver means, wherein n is an integer and n≧2, the method comprising:
   detecting, in at least one transceiver means, the condition of said medium;
   if a transceiver means wishes to transmit when said medium is detected busy, selecting, in the transceiver means, a random time slot in a sequence of time slots and setting its back-off counter to indicate the chosen time slot, which back-off counter is operable to decrement its count at the end of each time slot in the sequence of time slots;
   if medium busy is detected, freezing, in the transceiver means, said back-off counter;
   detecting, in the transceiver means, if said medium busy was caused by a false alarm; and
   resuming, in the transceiver means, said back-off counter at the beginning of the immediate next time slot in the sequence of time slots after the time slot in which rejection of said false alarm occurs.

20. The method for transmitting and receiving messages according to claim 19, wherein a time slot is defined as a detection time followed by a switch time for said transceiver means.

21. The method for transmitting and receiving messages according to claim 19, wherein said method further comprises the step of:
   starting said back-off counter after the duration of a fixed inter-frame spacing following the end of the last transmission on said medium.

22. The method for transmitting and receiving messages according to claim 20, wherein said detection time of a time slot is the Clear Channel Assessment period during which period each transceiver means is receiving.

23. The method for transmitting and receiving messages according to claim 19, wherein said detection step is performed by,
   detecting a busy condition; or
   or detecting a free condition; or
   or detecting a false alarm condition.

24. The method for transmitting and receiving messages according to claim 23, wherein said method further comprises the steps of:
   if a busy condition, is detected, freezing said back-off counter; and
   resuming said back-off counter at the beginning of the next time slot following said busy condition of said medium.

25. The method for transmitting and receiving messages according to claim 19, wherein said method further comprises the step of:
   distinguishing between a false alarm condition and a busy condition by the use of the duration of the detected event.

26. The method for transmitting and receiving messages according to claim 19, wherein, if a modulation format IEEE 802.11a/802.11g is used, said method further comprises the step of:
   distinguishing a false alarm condition by detecting an absence of a long preamble symbol.

27. The method for transmitting and receiving messages according to claim 22, wherein, the DSSS modulation format defined in IEEE 802.1/802.11b and the short slot time defined in IEEE 802.11g is used, said method further comprises the step of:
   distinguishing between a false alarm condition and a busy condition by making use of a longer CCA period for detection of DSSS modulated signals.

28. At least one computer program product directly loadable into the internal memory of at least one digital computer, comprising software code portions for performing the steps of claim 19, when said at least one product is/are run on said at least one computer.

* * * * *